(12) United States Patent
Kettman

(10) Patent No.: US 6,311,610 B1
(45) Date of Patent: Nov. 6, 2001

(54) FOOD PRODUCT TOASTER

(75) Inventor: David L. Kettman, Lemont, IL (US)

(73) Assignee: Prince Castle Inc., Carol Stream, IL (US)

( * ) Notice: Subject to any disclaimer, the term of this patent is extended or adjusted under 35 U.S.C. 154(b) by 0 days.

(21) Appl. No.: 09/722,870

(22) Filed: Nov. 27, 2000

(51) Int. Cl.$^7$ .............................. A47J 37/00; A47J 37/08; F27B 9/36
(52) U.S. Cl. .............................. 99/386; 99/349; 99/390; 99/393; 99/423; 99/443 C; 219/388
(58) Field of Search ............................. 99/325–334, 336, 99/385–399, 361, 369, 443 R, 443 C, 374, 377–379, 397, 402, 349–351, 423, 427; 219/492, 497, 521, 386, 388, 40; 426/523, 520

(56) References Cited

U.S. PATENT DOCUMENTS

| | | | |
|---|---|---|---|
| 3,400,651 | * 9/1968 | Hatch | 219/388 |
| 3,611,913 | * 10/1971 | McGinley | 99/386 |
| 3,646,879 | * 3/1972 | Palmason et al. | 99/339 |
| 3,693,452 | * 9/1972 | McGinley et al. | 99/386 |
| 3,835,760 | * 9/1974 | Rekesius | 99/331 |
| 4,176,589 | * 12/1979 | Stuck | 99/443 C |
| 4,261,257 | * 4/1981 | Henderson et al. | 99/386 |
| 4,488,480 | * 12/1984 | Miller et al. | 99/349 X |
| 4,530,276 | * 7/1985 | Miller | 99/386 |
| 5,673,610 | * 10/1997 | Stuck | 99/393 |
| 5,821,503 | * 10/1998 | Witt | 219/388 |
| 5,960,704 | * 10/1999 | March et al. | 99/349 |

* cited by examiner

Primary Examiner—Timothy F. Simone
(74) Attorney, Agent, or Firm—John R. Hoffman

(57) ABSTRACT

A toaster for bread-type food products includes a generally upright using defining a toasting cavity having a top mouth for depositing the food products into the cavity and a bottom opening from which toasted food products exit the cavity. A conveyor conveys the food products through the cavity. A toasting heater platen spaced from the conveyor toasts the food products as they are conveyed through the cavity. A flexible chute is disposed at the bottom opening of the cavity and against which the toasted food products are deposited as they exit the cavity. The flexible chute directs the toasted food products away from the opening at an angle to the direction the food products are conveyed through the cavity.

26 Claims, 7 Drawing Sheets

FOOD PRODUCT TOASTER

FIELD OF THE INVENTION

This invention generally relates to the art of heating apparatus for food products and, particularly, to a toaster for bread-type food products, such as a conveyor-type toaster.

BACKGROUND OF THE INVENTION

Electrical toasters are used in a wide variety of applications ranging from small one or two slice home toasters to larger continuously operating commercial toasters. Such appliances are used to toast sliced bread, rolls, muffins, biscuits, bagels, buns and similar food products. Commercial toasters are used widely in high volume restaurants, for instance.

One type of continuously operating toaster is a conveyor toaster which can continuously move food products seriatim through the appliance. A typical conveyor toaster includes a housing defining at least one toasting cavity. A conveyor defines one side of the cavity for conveying the food products therethrough. A toasting heater platen defines an opposite side of the cavity spaced from the conveyor to sandwich the food products therebetween as the products are conveyed through the cavity.

One type of conveyor toaster which has become quite prominent, particularly in high volume restaurants or similar establishments, is an "upright" conveyor toaster. Such toasters have generally rectangular upright housings defining vertically oriented cavities with vertical conveyors therewithin. A top mouth is provided in an upper wall of the housing for depositing the food products into the cavity. The toasted food products exit the cavity through a bottom opening in the housing. A major problem with such upright toasters is the height of the toasters when placed on conventional countertops in high volume restaurants or similar establishments. If the appliance is too high, it is extremely difficult for many individuals to deposit the food products into the top mouth of the upright housing. If the appliance is made too short, it is difficult to direct the toasted food products away from the bottom opening in the housing. In other words, a ramp typically is provided immediately below the bottom opening in an attempt to direct the toasted food products forwardly away from the housing so that the products do not stack-up and jam immediately below the bottom opening in the housing. This could be solved by providing a rather steep or highly inclined ramp, but such ramps would undesirably increase the height of the appliance.

The present invention is directed to solving the myriad of problems discussed above by providing a unique flexible chute at the bottom opening of the toasting cavity to direct the toasted food products from the bottom opening forwardly of the appliance. The flexible chute provides a unique variable radius as the products exit the cavity. The flexible chute is so effective that the entire upright housing can be tilted forwardly so that the top mouth for depositing the food products into the cavity actually faces an operator. Of course, it should be understood that the invention and the advantages thereof are equally applicable for other heating apparatus for food products other than conveyor toasters.

SUMMARY OF THE INVENTION

An object, therefore, of the invention is to provide a new and improved heating apparatus for food products.

Another object of the invention is to provide a new and improved toaster for bread-type food products, such as a conveyor-type toaster.

In the exemplary embodiment of the invention, the heating appliance or toaster defines at least one toasting cavity having a top mouth for depositing the food products into the cavity and a bottom opening from which toasted food products exit the cavity. A flexible chute is disposed at the bottom opening of the cavity and against which the toasted food products are deposited as they exit the cavity. The flexible chute inherently provides a variable radius and directs the toasted food products away from the opening at an angle to the direction the food products are conveyed through the cavity.

As disclosed herein, a conveyor is provided at one side of the cavity for conveying the food products therethrough. A toasting heater platen is provided at an opposite side of the cavity spaced from the conveyor and between when the food products pass as the products are conveyed through the cavity.

According to one aspect of the invention, the flexible chute comprises a flexible sheet. The sheet extends from a point generally inside the top mouth of the cavity, through the bottom opening of the cavity and outwardly thereof. The sheet is anchored at one end thereof generally at the point inside the top mouth of the cavity and at an opposite end at a point outside the cavity, with the sheet being free between those points. Preferably, the flexible sheet has a release surface engageable by the food products.

According to another aspect of the invention, the housing has a front face facing an operator, an upper end at which the top mouth of the cavity is located and a lower end at which the bottom opening is located. The housing is tilted forwardly whereby the top mouth is closer to the operator than the bottom opening. The housing includes a downwardly inclined ramp extending forwardly from below the bottom opening of the cavity. The flexible chute extends over the inclined ramp.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
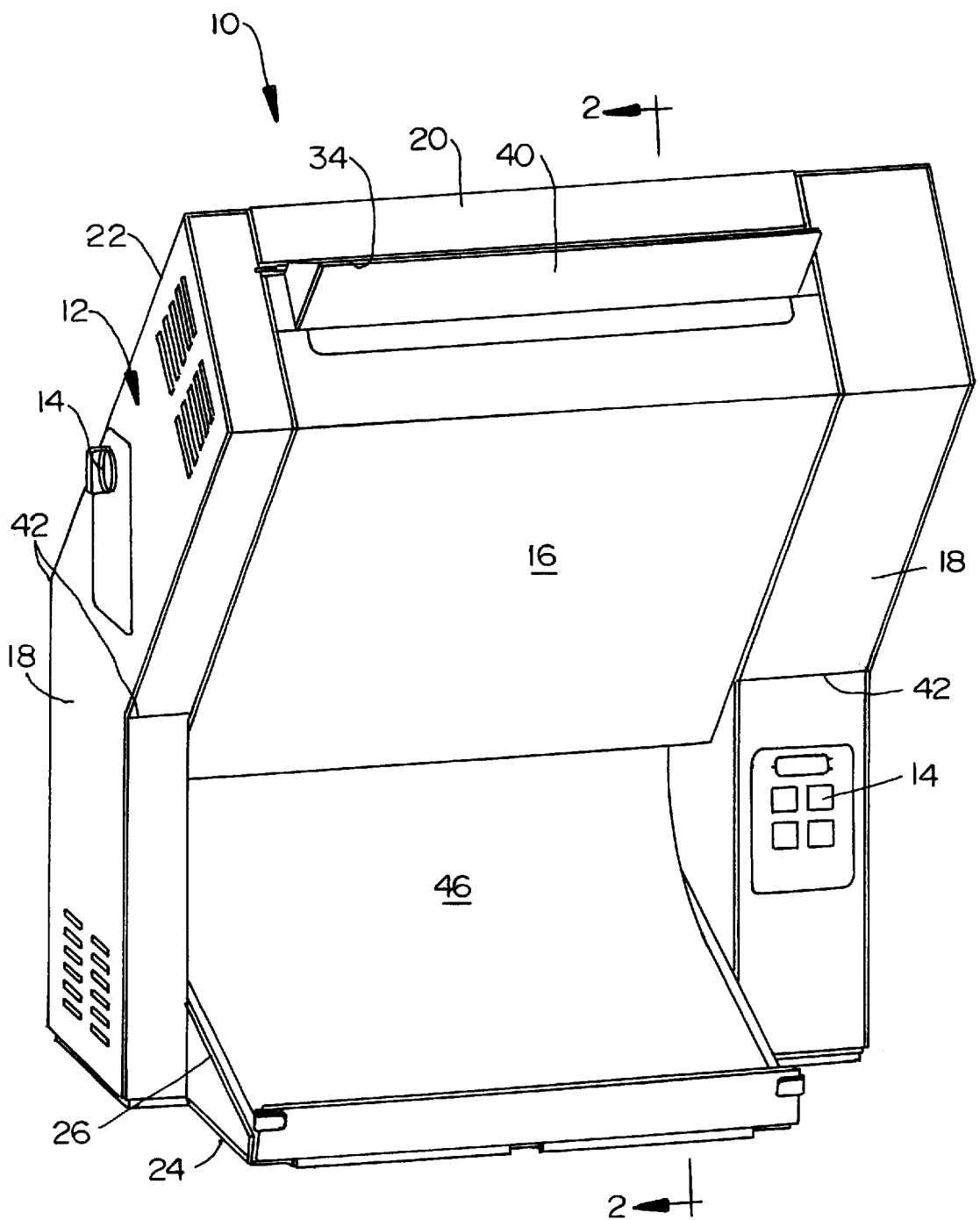
FIG. 1 is a front perspective view of a toaster incorporating the concepts of the invention.

Referring to the drawings in greater detail, and first to FIG. 1, the invention is embodied in an upright toaster, generally designated 10, for bread-type food products. The toaster includes a generally upright housing, generally designated 12, having appropriate controls 14 on the top and one side thereof.

Figure 2:
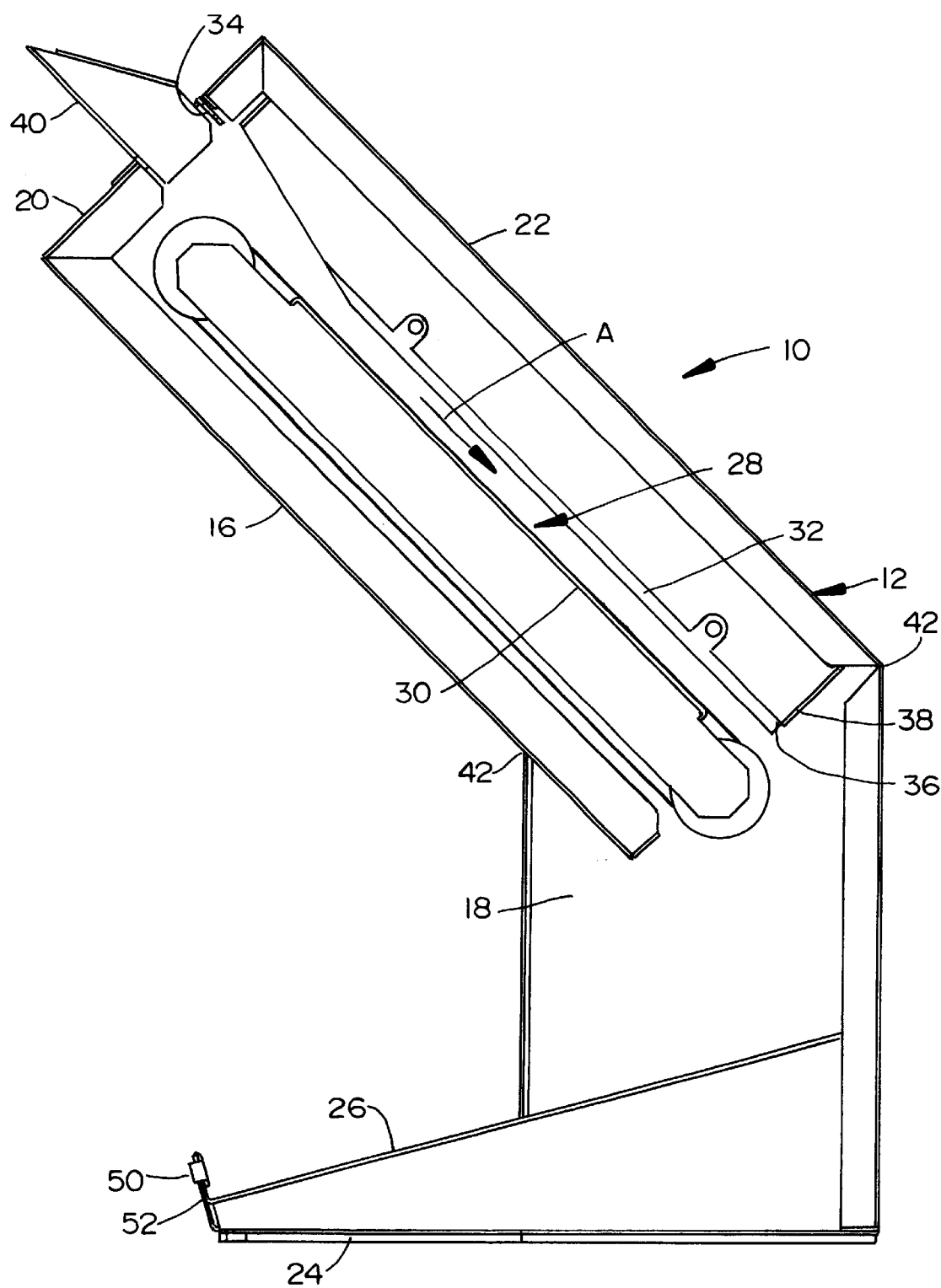
FIG. 2 is a vertical section taken generally along line 2—2 of FIG. 1, but with the flexible chute-forming sheet removed.

Referring to FIG. 2 in conjunction with FIG. 1, upright housing 12 includes a front face 16 for facing an operator, a pair of side walls 18, an upper end wall 20, a rear wall 22, and a base 24 having an outwardly and downwardly inclined ramp 26. The entire housing is fabricated substantially of stamped and formed sheet metal material.

Referring specifically to FIG. 2, housing 12 defines a toasting cavity, generally designated 28. An elongated, closed loop-type conveyor 30 is shown somewhat schematically for conveying food products through cavity 28 in the direction of arrow "A". A flat toasting heater platen 32 is disposed at an opposite side of the cavity spaced from conveyor 30 and between which food products pass as the products are conveyed through the conveyor, as will be seen hereinafter. A top mouth 34 is provided in upper end wall 20 for depositing the food products into cavity 28. A bottom opening 36 is provided in a lower end 38 and from which toasted food products exit the cavity. A trough 40 may be provided immediately in front of top mouth 34 to assist and operator in guiding the food products into the top mouth of the cavity.

FIGS. 1 and 2 clearly show a novel aspect of the invention wherein the overall housing 12 is generally "elbow-shaped" whereby the entire upper portion of the housing which contains toasting cavity 28 is tilted or angled forwardly of an elbow 42. This not only reduces the overall height of the appliance, but upper end wall 20 and top mouth 34 face an operator at an angle which is in striking contrast to an operator having to stretch and deposit food products into a top mouth of an appliance wherein the top mouth faces directly vertically upward. The ease of operation is significantly more advantageous than prior art upright or vertical toasters or appliances.

Figure 3:
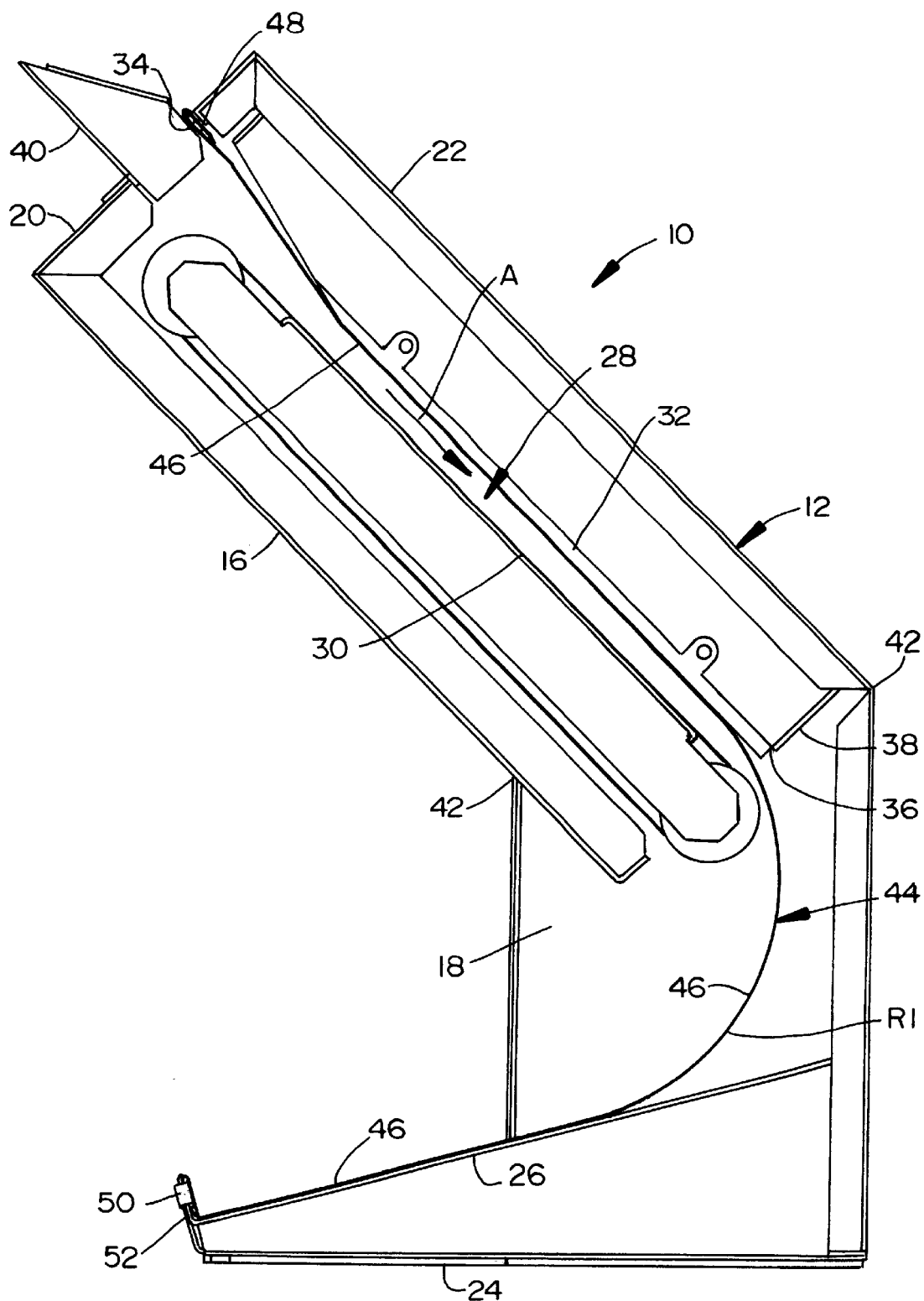
FIG. 3 is a view similar to that of FIG. 2, with the flexible chute properly installed.

FIG. 3 shows a unique feature of the invention which comprises a flexible chute, generally designated 44, which extends from bottom opening 36 of cavity 28 downwardly and forwardly of the opening, such as onto ramp 26. In other words, the flexible chute directs the toasted food products away from bottom opening 36 at an angle to the direction "A" in which the food products are conveyed through cavity 28. Flexible chute 44 is provided by a flexible sheet 46 which is fabricated of such materials as woven fiberglass. Preferably, the flexible sheet has a release surface which is engageable by the food products. For instance, the woven fiberglass material may be coated or impregnated with a release material such as Teflon.

As can be seen in clearly in FIG. 3, in the preferred embodiment, flexible sheet 46 extends all the way from a point inside top mouth 34, through cavity 28, out of bottom opening 36 and onto ramp 26. The top end is anchored by a clamp 48 at top opening 34. The bottom of the sheet is anchored by a clamp 50 on a lip 52 of base 24 which forms a stop for the toasted food products. Otherwise, flexible sheet 46 is free or loose along its length between top and bottom clamps 48 and 50, respectively. With a woven material such as fiberglass, the bowed sheet has a tendency to maintain its curvature below bottom opening 36 as seen in FIG. 3 as well as being juxtaposed against the front flat face of toasting heater platen 32.

FIGS. 4–7 show a first food product 54 and a second food product 56 which have been fed seriatim into cavity 28 to be conveyed therethrough in the direction of arrow "A". These depictions also show the unique functioning of flexible chute 44 provided by flexible sheet 46. Food products 54 and 56 may be such products as sliced bun halves for sandwiches, with the sliced sides of the bun halves moving through cavity 28 in engagement with heater platen 32 to be toasted thereby. However, it can be seen that flexible sheet 46 is interposed between the bun halves and the heater platen.

Figure 4:
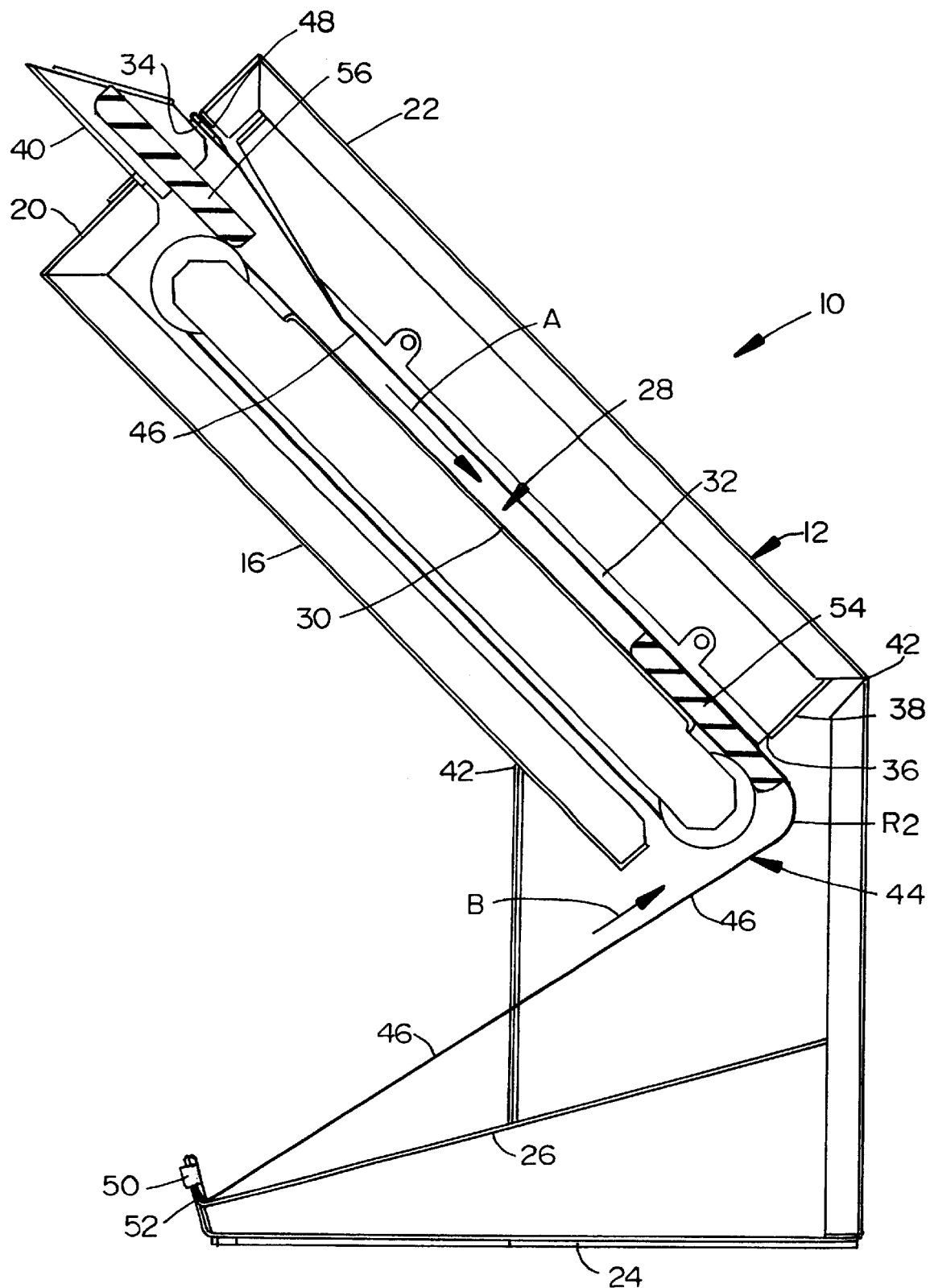
FIGS. 4–7 are views similar to that of FIG. 3, but showing sequential views of a pair of bread-type food products being conveyed through the toaster and along the flexible chute.

More particularly, FIG. 4 shows first food product 54 just starting to exit bottom opening 36 while second food product 56 is being deposited into top mouth 34. In comparing FIG. 4 with FIG. 3, it can be seen that first food product 54 has engaged flexible chute 44 and has stretched the sheet in the direction of arrow "B" (FIG. 4), lifting the sheet off of ramp 56. The large radius R1 of the flexible sheet in FIG. 3 has now become a small radius R2 in FIG. 4 as product 54 exits bottom opening 34.

Figure 5:
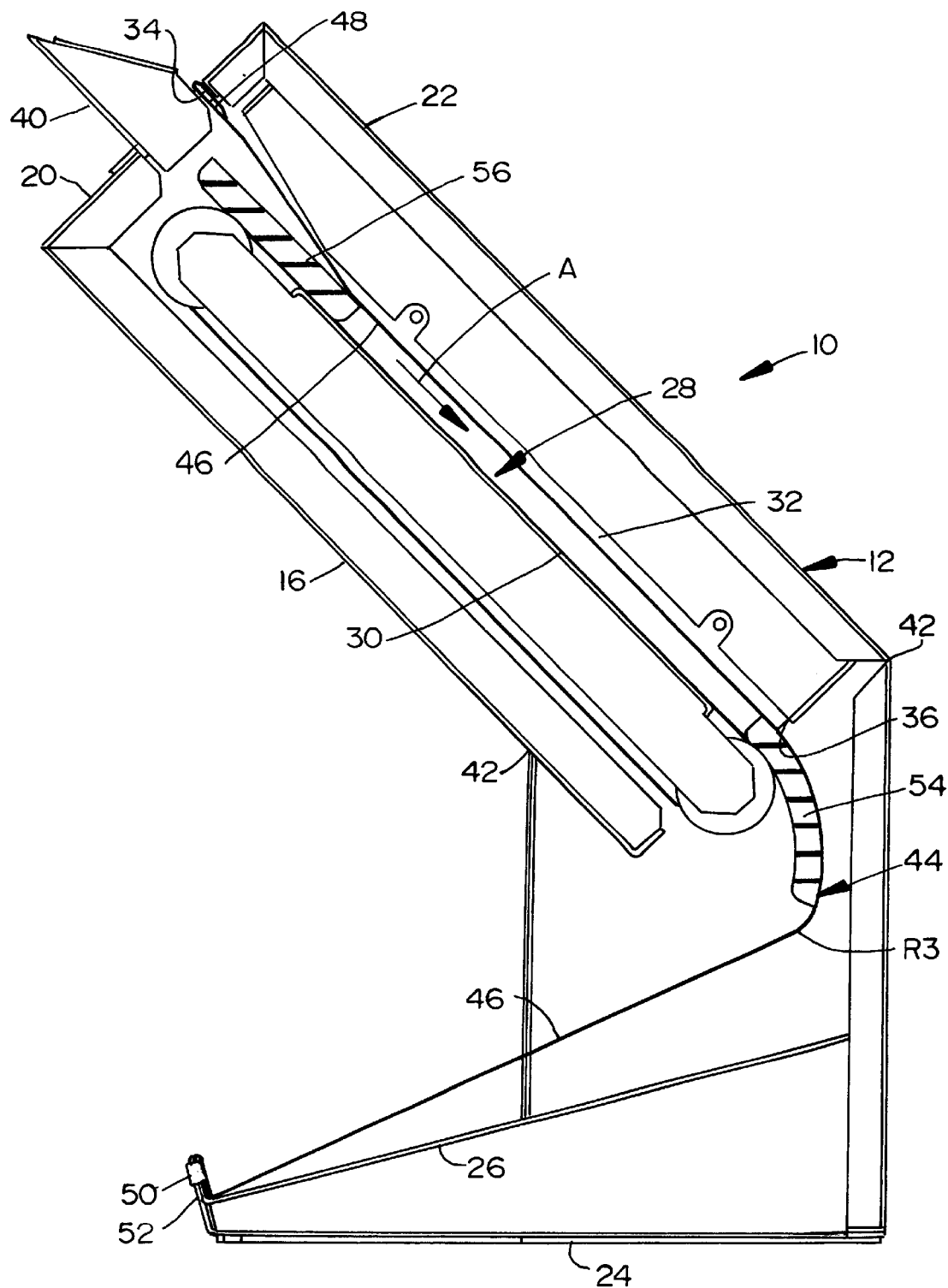

FIG. 5 shows first food product 54 substantially exiting bottom opening 36 of cavity 28 and onto flexible chute 44 provided by flexible sheet 46. Another different radius R3 has been formed in the flexible sheet in comparison to radii R2 in FIG. 4 and R1 in FIG. 3.

Figure 6:
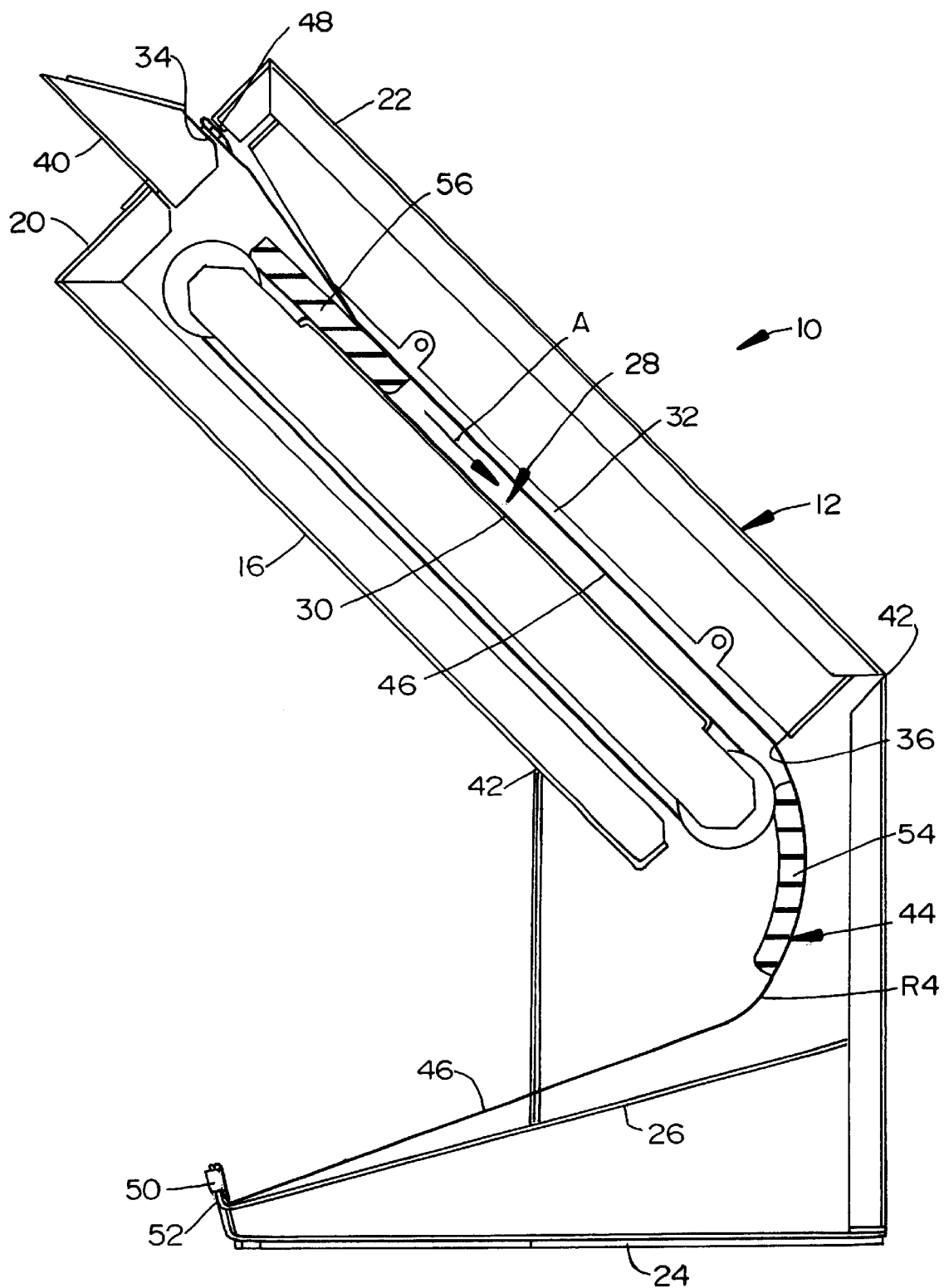

FIG. 6 shows first food product 54 completely out of bottom opening 36 and cavity 28 as flexible chute 44 has still a different radius R4. It should be understood that the position of first food product 54 in FIG. 6 is quite momentary, because the food product now is falling by gravity from bottom opening 36 downwardly toward ramp 26. The food product will slide along the release surface of flexible sheet 46. It also can be seen that the second food product 56 has now entered cavity 28 to be conveyed therethrough in the direction of arrow "A" by conveyor 46.

Figure 7:
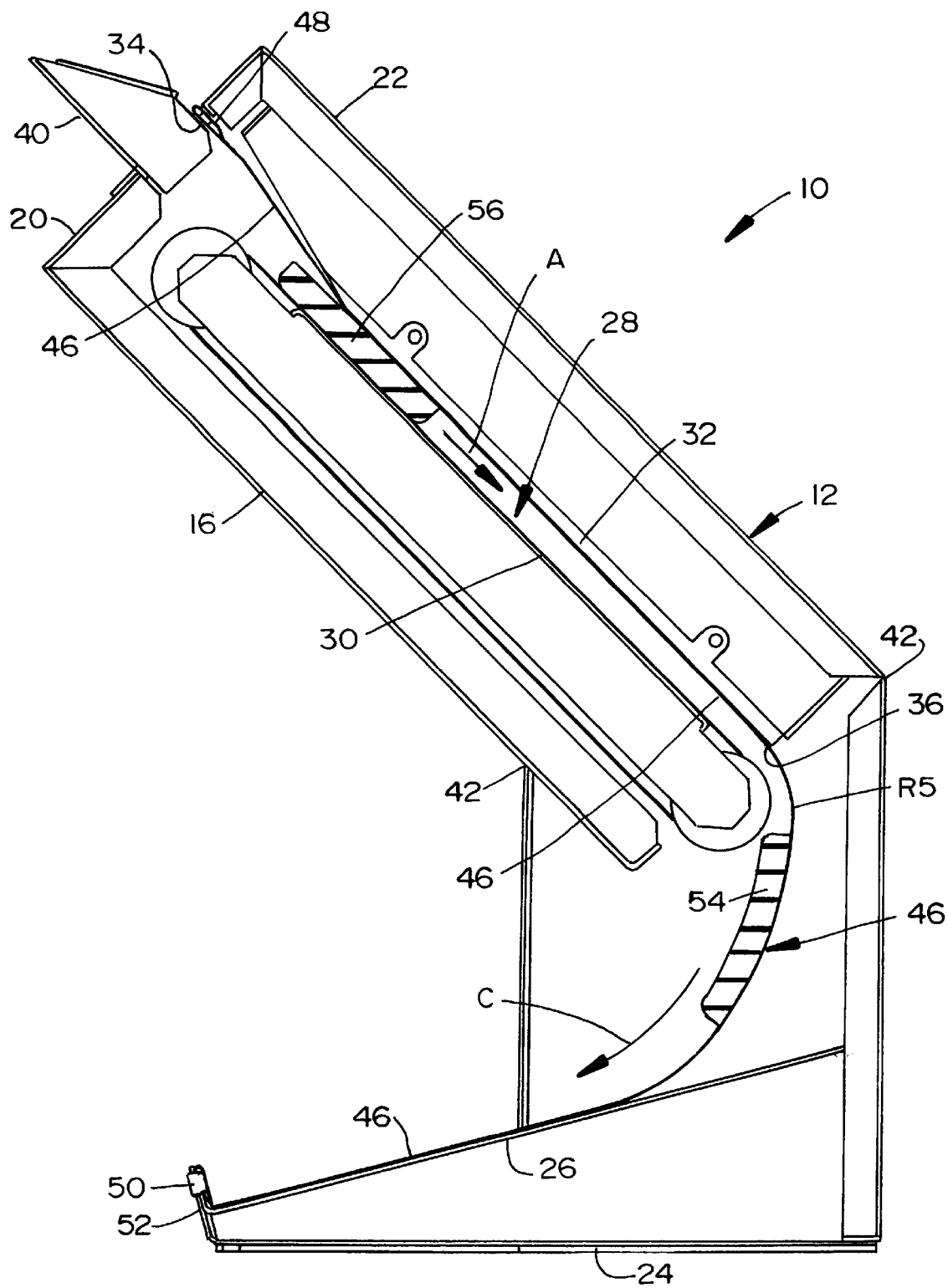

Finally, FIG. 7 shows first food product 54 sliding down flexible sheet 46 of flexible chute 44 in the direction of arrow "C" toward stop lip 52 at the front end of ramp 26. Although the flexible sheet has assumed still a further radius R5, this radius closely resembles the initial or unloaded radius R1 shown in FIG. 3, awaiting a seriatim or second food product 56 to reach the bottom opening of cavity 28 whereupon the second food product will move along the inside curvature of flexible chute 44 provided by flexible sheet 46.

The advantages afforded by flexible chute 44 comprised of flexible sheet 46 are multiple. The angle or inclination of ramp 26 onto which the toasted food products are deposited can be maintained relatively small, because the food products are directed downwardly and forwardly by the constantly changing radius of flexible chute 44 before the products even reach the ramp. The low-angle ramp, in turn, significantly reduces the overall height of the appliance or toaster. In other words, the rear or inner end of the ramp would have to be significantly elevated to prevent toasted food products from stacking-up or jamming under the bottom opening of the toasting cavity. In addition, the entire upper portion of housing 12 within which toasting cavity 28 is disposed, is tilted forwardly at elbow 42. Again, this configuration of the housing significantly reduces the overall height of the appliance or toaster. The forward inclination of the housing, in turn, allows upper end wall 20 and top mouth 34 to face an operator (as seen in FIG. 1) to a greater extent than if the upper end wall and top mouth faced directly vertically upward as in the prior art. Still further, by providing a continuous sheet which runs all the way from top mouth 34, through cavity 28, past bottom opening 36 and to stop lip 52, abrupt surfaces or interruptions are avoided, to provide a consistent appearance to the toasted sides of the food products. In addition, this continuously running flexible wall makes it easier to maintain the interior of the appliance clean and free of food product crumbs or the like.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. A toaster for bread-type food products, comprising:
a generally upright housing defining at least one toasting cavity having a top mouth for depositing the food products into the cavity and a bottom opening from which toasted food products exit the cavity;
a conveyor at one side of the cavity for conveying the food products therethrough;
a toasting heater platen at an opposite side of the cavity spaced from the conveyor and between which the food products pass as the products are conveyed through the cavity; and
a flexible chute at the bottom opening of the cavity and against which the toasted food products are deposited as they exit the cavity, the flexible chute directing the toasted food products away from the opening at an angle to the direction the food products are conveyed through the cavity.

2. The toaster of claim 1 wherein said flexible chute comprises a flexible sheet.

3. The toaster of claim 2 wherein said flexible sheet has a release surface engageable by the food products.

4. The toaster of claim 2 wherein said flexible sheet extends from a point generally inside said top mouth of the cavity, through said bottom opening and outwardly of the cavity.

5. The toaster of claim 4 wherein said flexible sheet is anchored at one end thereof generally at said point inside the top mouth of the cavity and at an opposite end at a point outside the cavity, the flexible sheet being free between said points.

6. The toaster of claim 1 wherein said housing has a front face for facing an operator, an upper end at which said top mouth of the cavity is located and a lower end at which said bottom opening is located, the housing being tilted forwardly whereby the top mouth is closer to the operator than the bottom opening.

7. The toaster of claim 6 wherein said housing includes a downwardly inclined ramp extending forwardly from below the bottom opening of the cavity.

8. The toaster of claim 7 wherein said flexible chute extends over said inclined ramp.

9. The toaster of claim 8 wherein said flexible chute comprises a flexible sheet.

10. A toaster for bread-type food products, comprising:
a generally upright housing defining at least one toasting cavity having a top mouth for depositing the food products into the cavity and a bottom opening from which toasted food products exit the cavity, said housing having a front face for facing an operator, an upper end at which said top mouth of the cavity is located and a lower end at which said bottom opening is located, the housing being tilted forwardly whereby the top mouth is closer to the operator than the bottom opening;
a conveyor at one side of the cavity for conveying the food products therethrough;
a toasting heater platen at an opposite side of the cavity spaced from the conveyor and between which the food products pass as the products are conveyed through the cavity; and
a flexible chute at the bottom opening of the cavity and against which the toasted food products are deposited as they exit the cavity, the flexible chute directing the toasted food products away from the opening at an angle to the direction the food products are conveyed through the cavity, the flexible chute being provided by a flexible sheet which extends from a point generally inside said top mouth of the cavity, through said bottom opening and outwardly of the cavity.

11. The toaster of claim 10 wherein said flexible sheet has a release surface engageable by the food products.

12. The toaster of claim 10 wherein said flexible sheet is anchored at one end thereof generally at said point inside the top mouth of the cavity and at an opposite end at a point outside the cavity, the flexible sheet being free between said points.

13. The toaster of claim 10 wherein said housing includes a downwardly inclined ramp extending forwardly from below the bottom opening of the cavity.

14. The toaster of claim 13 wherein said flexible chute extends over said inclined ramp.

15. A heating apparatus for food products, comprising:
a generally upright housing defining at least one heating cavity having a top mouth for depositing the food products into the cavity and a bottom opening from which heated food products exit the cavity;
a conveyor on the housing for conveying the food products through the cavity;
a heater in the housing for heating the food products as the products are conveyed through the cavity; and
a flexible chute at the bottom opening of the cavity and against which the toasted food products are deposited as they exit the cavity, the flexible chute directing the toasted food products away from the opening at an angle to the direction the food products are conveyed through the cavity.

16. The heating apparatus of claim 15 wherein said flexible chute comprises a flexible sheet.

17. The heating apparatus of claim 16 wherein said flexible sheet has a release surface engageable by the food products.

18. The heating apparatus of claim 16 wherein said flexible sheet extends from a point generally inside said top mouth of the cavity, through said bottom opening and outwardly of the cavity.

19. The heating apparatus of claim 18 wherein said flexible sheet is anchored at one end thereof generally at said point inside the top mouth of the cavity and at an opposite end at a point outside the cavity, the flexible sheet being free between said points.

20. The heating apparatus of claim 15 wherein said housing has a front face for facing an operator, an upper end at which said top mouth of the cavity is located and a lower end at which said bottom opening is located, the housing being tilted forwardly whereby the top mouth is closer to the operator than the bottom opening.

21. The heating apparatus of claim 10 wherein said housing includes a downwardly inclined ramp extending forwardly from below the bottom opening of the cavity.

22. The heating apparatus of claim 21 wherein said flexible chute extends over said inclined ramp.

23. A toaster for bread-type food products, comprising:
a generally upright housing including
a front face for facing an operator,
an upper end,
a lower end,
an interior toasting cavity extending between said ends,
a top mouth at the upper end for depositing the food products into the cavity, a bottom opening at the lower end from which toasted food products exit the cavity, and the housing being tilted forwardly whereby the top mouth is closer to the operator than the bottom opening; and heater means in the housing for toasting the food products within the cavity.

24. The toaster of claim 23, including a conveyor at one side of the cavity for conveying the food products therethrough.

25. The toaster of claim 24 wherein said heater means comprises a toasting heater platen at an opposite side of the cavity spaced from the conveyor and between which the food products pass as the products are conveyed through the cavity.

26. The toaster of claim 23 wherein said housing includes a downwardly inclined ramp extending forwardly from below the bottom opening of the cavity.

* * * * *